United States Patent
Pye et al.

[11] 3,773,565
[45] Nov. 20, 1973

[54] ZONE REFINING

[75] Inventors: Angus Charles Pye, Harpenden, England; Bengt Lundgren, Ulricehamn, Sweden

[73] Assignee: SKF Industries, Inc., King of Prussia, Pa.

[22] Filed: Nov. 27, 1970

[21] Appl. No.: 93,018

[52] U.S. Cl............. 148/1, 29/148.4 R, 148/4, 148/13
[51] Int. Cl............. C21d 1/34, C21d 9/40
[58] Field of Search............. 148/1, 2, 3, 4, 13, 148/14; 29/148.4 R, 526.2, 526.3, 526.4, 527.6; 75/10; 219/121 P

[56] References Cited
UNITED STATES PATENTS

| | | | |
|---|---|---|---|
| 2,968,723 | 1/1961 | Steigerwald | 148/13 R |
| 3,231,430 | 1/1966 | Krieger et al. | 148/4 |
| 1,064,671 | 6/1913 | Simpson | 148/14 |
| 2,778,926 | 1/1957 | Schneider | 75/10 R |
| 3,086,856 | 4/1963 | Siebertz | 75/10 R |
| 3,505,126 | 4/1970 | Antes | 148/1 |

Primary Examiner—Charles N. Lovell
Attorney—Howson and Howson

[57] ABSTRACT

A method of making a machine component comprising forming the component to shape and, before heat treating to harden it or finish machining it, re-melting at least one zone on its surface by means of an energy beam while the component is in a vacuum.

5 Claims, 4 Drawing Figures

ZONE REFINING

This invention relates to the manufacture of machine components which are improved by improving the metallurgy of a small proportion of the whole volume of the component which small proportion is bounded by a surface. Among such components are gears and the race rings of ball bearings which are improved by improving the metallurgy of a small proportion of the whole component at and adjacent its surface where, in use, it will come into intermittent contact with and be heavily loaded by another machine component, to increase its fatigue endurance.

Hitherto such components have normally been made by forming the component to shape, then heat treating it and then finish machining it accurately to shape. The race ring of a ball bearing, for example, is turned to shape, then heat treated to harden it, and then those portions of its surface where dimensional accuracy is important are finish machined by grinding.

When the component, as is usual, is made of steel, the inclusion of, for example, oxides, alumina, titanium nitride and zirconium nitride in the steel reduces the fatigue endurance as compared with a steel in which there are no such brittle inclusions. In order to reduce the brittle inclusions in a steel, it is known to melt the whole batch of steel in a vacuum in an electron beam furnace and then to carry out the steps mentioned above in order to make the machine component.

According to the present invention, a method of making a machine component comprises forming the component to shape and, before heat treating to harden it or finish machining it, re-melting at least one zone on its surface by means of an energy beam while the component is in a vacuum. Subsequently the component may be heat treated and/or finish machined, though these steps are not essential to the invention. The preferred energy beam is an electron beam.

The zone or zones re-melted will of course include those parts of the surface area of the component which bound the portions whose metallurgy is to be improved.

The re-melting step of the invention reduces the brittle inclusions and also reduces the sulphide inclusions in that part of the steel of a ball bearing race ring which is re-melted and the method of the invention may be employed where it is desired to reduce such sulphide inclusions. However its main attraction at the present time is in reducing the brittle inclusions in the small zone with which the balls actually come into contact as this increases the fatigue endurance of the ring.

When the steel is such that rapid cooling of it is liable to cause cracking, another feature of the invention provides that the whole component may be pre-heated before re-melting of the zone or zones.

Whether or not this feature is adopted depends primarily on economic considerations. If the electron beam is intense, it can re-melt the zone very rapidly without substantial transfer of heat to the surrounding metal. When the re-melted metal again solidifies, the result is to set up substantial stresses within the component which may cause cracks. This can be avoided by pre-heating the whole component, so that the re-melted zone cools more slowly, or by reducing the intensity of the electron beams, at least initially, so that it takes longer to re-melt the required zone and more heat is transferred to the surrounding metal. The choice then depends primarily on whether it is cheaper to pre-heat the whole component or to use the vacuum and electron beam equipment for longer.

The invention also includes machine components when made in accordance with the method of the invention.

The method of the invention and tests carried out on two inner rings of ball bearings will now be described, by way of example of the invention, with reference to the accompanying drawings, of which:

Figure 1:
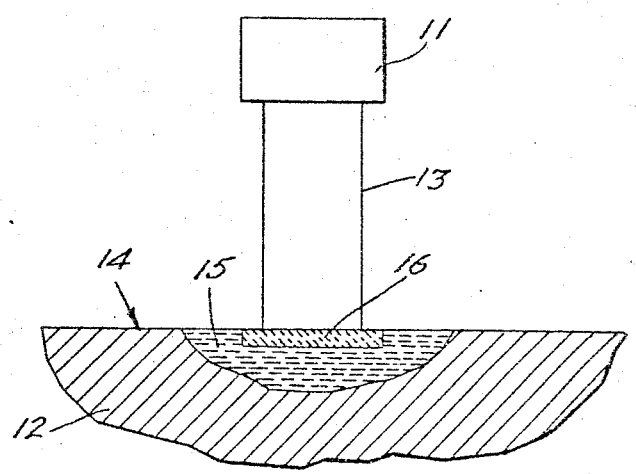
FIG. 1 is a diagram illustrating the method of the invention.

Referring to the drawings, FIG. 1 shows conventional electron beam welding equipment with an electron beam source, represented by the rectangle 11, and a machine component 12 (a portion only of which is shown in section) in place as the work piece. The electron beam 13, from the beam source 11, impinges on the surface 14 and melts a shallow pool 15 of the metal of the work piece 12. This pool is bounded by the surface 14 and its maximum depth and other dimensions depend on the power and intensity of the electron beam and the time it impinges on the surface 14.

The work piece is fed in a direction at right angles to the plane of the paper relative to the electron beam and in this way a zone bounded by the surface 14 is melted, the total volume melted being a small proportion of the whole volume of the work piece.

The power and intensity of the electron beam and the relative speed of the work piece and beam are adjusted so that an adequate depth and width of metal is melted. If convenient, the full width of the zone whose metallurgy is to be improved is melted in one pass. In the drawing the width and depth of a zone whose metallurgy needs to be improved is indicated by the hatched area 16 in the molten metal 15.

If the zone whose metallurgy is to be improved is wider than is shown, the electron beam can be scanned across the surface 14 at right angles to the direction of feed of the work piece, or the work piece can be set up again so that the electron beam melts a second zone overlapping the first, and so on until the required width has been obtained.

Figure 2:
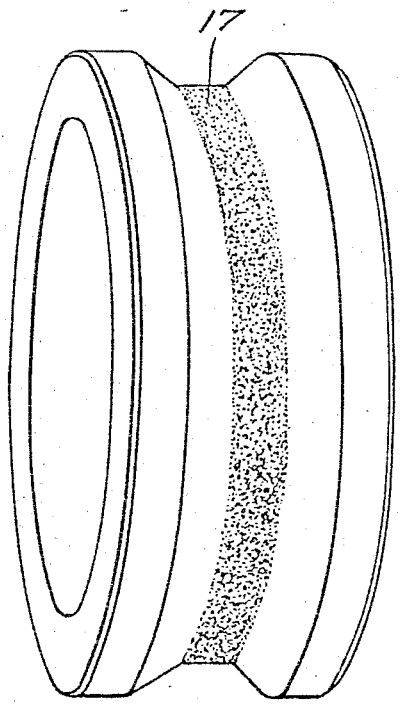
FIG. 2 is a perspective view of an inner ring of a ball bearing after re-melting of a zone and before heat treatment and finish machining.

Two inner rings of ball bearings have been treated by this method as will be described below as Example I and Example II. After re-melting but before heat-treatment or finish machining, both had the appearance shown in FIG. 2, in which 17 is the zone re-melted.

EXAMPLE I

Figure 3:
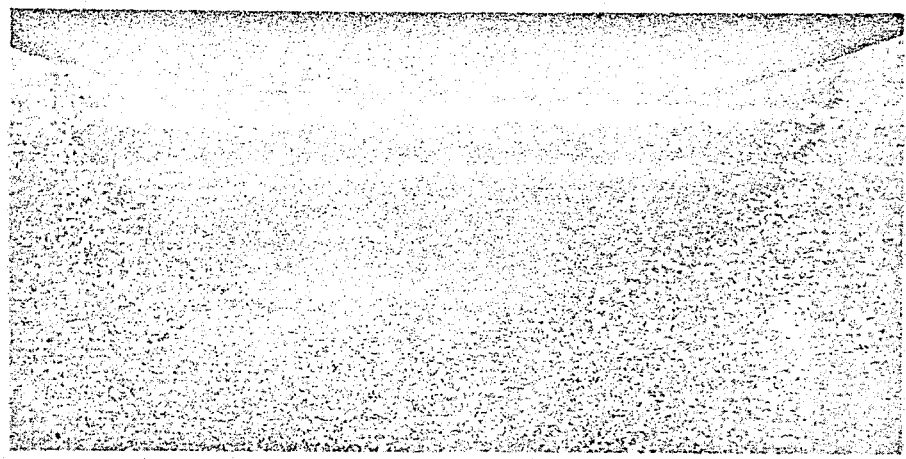
FIGS. 3 and 4 are micro-photographs of the re-melted zones of two inner rings of ball bearings.

An inner bearing ring was turned from case-hardening steel of average hardness of 150 Brinell and mounted in electron beam welding equipment where, under vacuum, a zone at the bottom of the race groove was subjected to a 60KV 18mA beam defocussed with a 3.5 mA "Y" deflection, the beam passing over the ring at a speed of 17 inches per minute which was equivalent to a process time of about 25 seconds for the ring concerned. This resulted in a zone on the race surface of the ring being melted which was 4 mm wide and 1.4 mm deep. The ring was sectioned and a micro-photograph taken of the re-melted zone and adjacent part of the ring. A representation of this microphotograph is FIG. 3. This shows that although the centre of the re-melted zone was flatter than before remelting, it could be restored satisfactorily to the required shape by finish machining without removing all the metal whose metallurgy had been improved. The structure in the re-melted zone was coarse grained martensite and ferrite. The re-melted zone exhibited no cracks and no porosity. The hardness of the re-melted zone was 441 HV5–44.5 HRC measured at this stage (i.e., before any case-hardening step). The inclusion of various constituents before treatment and in the zone after treatment was compared, with the following result:

|  | Before | After |
|---|---|---|
| Sulphides | 9.5 | .5 |
| Alumina | 0.03 | Untraceable |
| Oxides | 0.06 | 0.03 |
| Tin | 0.7 | 0.06 |

EXAMPLE II

Figure 4:
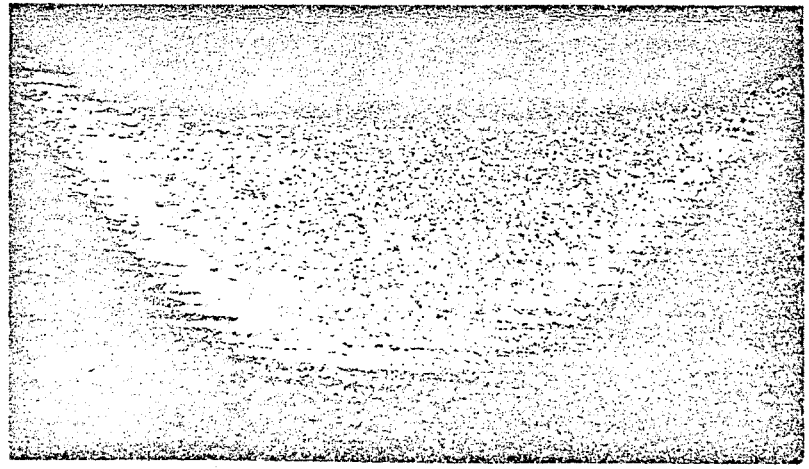

An inner bearing ring, turned from a through-hardening steel and already heat treated to harden it was available. This ring was then mounted in electron beam welding equipment where, under vacuum, a zone at the bottom of the race groove was subjected to a 60KV 14mA beam defocussed with 3mA "Y" deflection, the beam passing over the ring at a speed of 5 inches per minute which was equivalent to a process time of about 85 seconds for the ring concerned. This resulted in a zone on the race surface of the ring being melted which was 5.5 mm wide and 1.5 mm deep. The ring was sectioned and a micro-photograph was taken of the remelted zone and adjacent part of the ring. A representation of this micro-photograph is FIG. 4. This showed that the metallurgy of the whole ring had been changed as though it had been heated to about 450°C, which resulted in an unacceptable change in dimensions. If the ring had not been heat treated to harden it before being subject to the electron beam, but had been treated in accordance with the invention, the change in dimensions would be negligible, but the metallurgical changes in the re-melted zone would be the same.

The centre of the re-melted zone was flatter than before re-melting, but only to such an extent as could be satisfactorily restored to the required shape by finish machining without removing all the metal whose metallurgy had been improved. The structure in the melted zone immediately below the surface was mainly fine pearlite with some martensite, mainly at the grain boundaries. Outside the re-melted zone, the original martensitic structure had been tempered back, with recipitation of fine carbides. The hardness of the remelted zone was 484 HV5=48.0 HRC. The inclusion of various constituents before treatment and in the zone after treatment was compared with the following result:

|  | Before | After |
|---|---|---|
| Sulphides | 4.3 | 0.3 |
| Alumina | 1.0 | 0.6 |
| Oxides | 0.06 | Untraceable |
| Tin | 0.1 | Untraceable |

A portion of the ring was then rehardened and tempered. The structure in the re-melted zone showed a finer martensite and finer carbides than in the remainder of the section. The hardness in the melted zone had been restored to satisfactory level.

Comparative endurance tests have been carried out on type 6309 bearings with races made of a through hardening steel which had not been melted in a vacuum in an electron beam furnace. One batch (the control batch) had their inner races made by conventional methods. The other batch had inner races each of which had been made in accordance with the invention. The load used in the test was such that the control batch had an $L_{10}$ life of 1.2 million revolutions. The other batch, tested with the same load had an $L_{10}$ life of 7 million revolutions. This indicates that, by employing the invention, an increase in life of nearly six times can be obtained.

What we claim is:

1. A method of making a gear component made of a steel composition having a predetermined working zone less than the total peripheral surface of the gear component consisting of the steps of forming the component with a surface constituting the working zone, remelting the working zone by means of an electron beam while the component is in a vacuum to reduce the brittle and sulfide inclusions and increase the fatigue endurance of said working zone, and thereafter heat treating the gear component to harden the same.

2. A method of making an annular member made of a steel composition having a circumferentially extending working surface consisting of the steps of forming the annular member with a surface constituting a raceway surface, remelting the surface of said raceway by means of an electron beam while the annular member is in a vacuum to reduce the brittle and sulfide inclusions and increase the fatigue endurance of said raceway zone.

3. A method of making a bearing ring made of a steel composition having a circumferentially extending raceway surface zone consisting of the steps of forming the bearing ring with a raceway surface zone, remelting the raceway surface zone by means of an electron beam while the ring is in a vacuum to reduce brittle and sulfide inclusions and increase the fatigue endurance of said zone, and thereafter heat treating the bearing ring to harden the same and finish machining the bearing ring.

4. A method as claimed in claim 1 including the step of preheating the machine component to a temperature below its melting temperature before remelting the working zone.

5. An annular member made by the process of claim 1 wherein the hardness of the remelted bearing raceway zone is about 48.0 HRC and the inclusions in said zone are as follows:

Sulphides – about 0.3
Alumina – about 0.6
Oxides — untraceable
Tin — untraceable

* * * * *

UNITED STATES PATENT OFFICE
CERTIFICATE OF CORRECTION

Patent No. 3,773,565          Dated November 20, 1973

Inventor(s) Angus Charles Pye and Bengt Lundgren

It is certified that error appears in the above-identified patent and that said Letters Patent are hereby corrected as shown below:

Column 4, line 36; "surface" should read -- zone --

Column 4, line 36; insert the word zone after raceway

Signed and sealed this 4th day of June 1974.

(SEAL)
Attest:

EDWARD M. FLETCHER, JR.
Attesting Officer

C. MARSHALL DANN
Commissioner of Patents